US008566903B2

(12) United States Patent
Kisin et al.

(10) Patent No.: US 8,566,903 B2
(45) Date of Patent: Oct. 22, 2013

(54) ENTERPRISE EVIDENCE REPOSITORY PROVIDING ACCESS CONTROL TO COLLECTED ARTIFACTS

(75) Inventors: Roman Kisin, San Jose, CA (US); Pierre Raynaud-Richard, Redwood City, CA (US)

(73) Assignee: International Business Machines Corporation, Armonk, NY (US)

(*) Notice: Subject to any disclaimer, the term of this patent is extended or adjusted under 35 U.S.C. 154(b) by 643 days.

(21) Appl. No.: 12/826,460

(22) Filed: Jun. 29, 2010

(65) Prior Publication Data

US 2011/0321124 A1    Dec. 29, 2011

(51) Int. Cl.
*G06F 7/04*    (2006.01)
*G06F 17/30*    (2006.01)

(52) U.S. Cl.
USPC .................. 726/2; 382/275; 706/45; 707/600

(58) Field of Classification Search
USPC ......... 707/600–604, 661, 670, 694, 705, 731, 707/792, 821–822, 828–830; 706/45–50; 382/275; 726/2; 705/7.21–7.28, 7.36
See application file for complete search history.

(56) References Cited

U.S. PATENT DOCUMENTS

| | | | |
|---|---|---|---|
| 5,313,609 A | 5/1994 | Baylor et al. | |
| 5,355,497 A | 10/1994 | Cohen-Levy | |
| 5,608,865 A | 3/1997 | Midgely et al. | |
| 5,701,472 A | 12/1997 | Koerber et al. | |
| 5,818,815 A | 10/1998 | Carpentier et al. | |
| 5,875,431 A * | 2/1999 | Heckman et al. ............ | 705/7.16 |
| 5,903,879 A | 5/1999 | Mitchell | |

(Continued)

FOREIGN PATENT DOCUMENTS

| | | |
|---|---|---|
| EP | 0 702 472 A1 | 3/1996 |
| EP | 2110781 A1 | 10/2009 |

(Continued)

OTHER PUBLICATIONS

Gijiko Kokan Hinshitsu Sokutei Kino o Tosai shita Test System, Abacus Advanced bulk Call Simulator, Business Communication 2001, vol. 38, No. 7, Jul. 2001, pp. 76-77.

(Continued)

*Primary Examiner* — Haresh N Patel
(74) *Attorney, Agent, or Firm* — Shumaker & Sieffert, P.A.

(57) ABSTRACT

A controller is configured to generate and propagate instructions to an execution agent which, in turn, is configured to collect and deposit collected artifacts into a repository. Write access to a location in the repository for collected artifacts that are to be deposited into a specified location is granted to the execution agent. Once the execution agent deposits the collected artifacts in the specified location in the repository, a summary of collected artifacts is propagated to the controller. The controller manages appropriate levels of access to the collected artifacts, while the repository enforces the level of access. The controller can grant read only access to the collected artifacts or it can allow for controlled changes to be made to the metadata associated with the collected artifact. An agent processes the data and generates additional metadata that can be associated with the collected artifacts and then saved in the repository. A system can have more than one repository, where the controller allocates storage in an appropriate repository and issues instructions to the execution agent with the location in an appropriate repository. The summary of the actual collections is then propagated to the controller from the repositories.

17 Claims, 15 Drawing Sheets

(56) References Cited

U.S. PATENT DOCUMENTS

| | | | |
|---|---|---|---|
| 5,963,964 A | 10/1999 | Nielsen | |
| 6,049,812 A | 4/2000 | Bertram et al. | |
| 6,115,642 A | 9/2000 | Brown et al. | |
| 6,128,620 A | 10/2000 | Pissanos et al. | |
| 6,151,031 A | 11/2000 | Atkins et al. | |
| 6,173,270 B1 | 1/2001 | Cristofich et al. | |
| 6,330,572 B1 | 12/2001 | Sitka | |
| 6,332,125 B1 | 12/2001 | Callen et al. | |
| 6,343,287 B1 | 1/2002 | Kumar et al. | |
| 6,401,079 B1 | 6/2002 | Kahn et al. | |
| 6,425,764 B1 | 7/2002 | Lamson | |
| 6,460,060 B1 | 10/2002 | Maddalozzo, Jr. et al. | |
| 6,539,379 B1 | 3/2003 | Vora et al. | |
| 6,553,365 B1* | 4/2003 | Summerlin et al. | 707/740 |
| 6,563,796 B1 | 5/2003 | Saito | |
| 6,607,389 B2 | 8/2003 | Genevie | |
| 6,622,128 B1 | 9/2003 | Bedell et al. | |
| 6,738,760 B1 | 5/2004 | Krachman | |
| 6,805,351 B2 | 10/2004 | Nelson | |
| 6,832,205 B1 | 12/2004 | Aragones et al. | |
| 6,839,682 B1 | 1/2005 | Blume et al. | |
| 6,944,597 B2 | 9/2005 | Callen et al. | |
| 6,966,053 B2 | 11/2005 | Paris et al. | |
| 6,976,083 B1 | 12/2005 | Baskey et al. | |
| 6,981,210 B2 | 12/2005 | Peters et al. | |
| 7,016,919 B2* | 3/2006 | Cotton et al. | 707/999.1 |
| 7,076,439 B1 | 7/2006 | Jaggi | |
| 7,082,573 B2 | 7/2006 | Apparao et al. | |
| 7,103,602 B2 | 9/2006 | Black et al. | |
| 7,104,416 B2 | 9/2006 | Gasco et al. | |
| 7,107,416 B2 | 9/2006 | Stuart et al. | |
| 7,120,914 B1 | 10/2006 | Manthos et al. | |
| 7,127,470 B2 | 10/2006 | Takeya | |
| 7,146,388 B2 | 12/2006 | Stakutis et al. | |
| 7,162,427 B1 | 1/2007 | Myrick et al. | |
| 7,197,716 B2 | 3/2007 | Newell et al. | |
| 7,206,789 B2 | 4/2007 | Hurmiz et al. | |
| 7,225,249 B1 | 5/2007 | Barry et al. | |
| 7,233,959 B2 | 6/2007 | Kanellos et al. | |
| 7,236,953 B1 | 6/2007 | Cooper et al. | |
| 7,240,296 B1 | 7/2007 | Matthews et al. | |
| 7,249,315 B2 | 7/2007 | Moetteli | |
| 7,281,084 B1 | 10/2007 | Todd et al. | |
| 7,283,985 B2 | 10/2007 | Schauerte et al. | |
| 7,284,985 B2 | 10/2007 | Genevie | |
| 7,292,965 B1 | 11/2007 | Mehta et al. | |
| 7,333,989 B1 | 2/2008 | Sameshima et al. | |
| 7,386,468 B2 | 6/2008 | Calderaro et al. | |
| 7,433,832 B1 | 10/2008 | Bezos et al. | |
| 7,451,155 B2 | 11/2008 | Slackman et al. | |
| 7,478,096 B2 | 1/2009 | Margolus et al. | |
| 7,496,534 B2 | 2/2009 | Olsen et al. | |
| 7,502,891 B2 | 3/2009 | Shachor | |
| 7,512,636 B2 | 3/2009 | Verma et al. | |
| 7,558,853 B2 | 7/2009 | Alcorn et al. | |
| 7,580,961 B2 | 8/2009 | Todd et al. | |
| 7,594,082 B1 | 9/2009 | Kilday et al. | |
| 7,596,541 B2 | 9/2009 | deVries et al. | |
| 7,614,004 B2 | 11/2009 | Milic-Frayling et al. | |
| 7,617,458 B1 | 11/2009 | Wassom, Jr. et al. | |
| 7,636,886 B2 | 12/2009 | Wyle et al. | |
| 7,720,825 B2 | 5/2010 | Pelletier et al. | |
| 7,730,148 B1 | 6/2010 | Mace et al. | |
| 7,742,940 B1 | 6/2010 | Shan et al. | |
| 7,774,721 B2 | 8/2010 | Milic-Frayling et al. | |
| 7,778,976 B2 | 8/2010 | D'Souza et al. | |
| 7,861,166 B1 | 12/2010 | Hendricks | |
| 7,865,817 B2 | 1/2011 | Ryan et al. | |
| 7,895,229 B1 | 2/2011 | Paknad | |
| 7,912,804 B1 | 3/2011 | Talwar et al. | |
| 7,962,843 B2 | 6/2011 | Milic-Frayling et al. | |
| 8,073,729 B2* | 12/2011 | Kisin et al. | 705/7.35 |
| 2001/0053967 A1 | 12/2001 | Gordon et al. | |
| 2002/0007333 A1 | 1/2002 | Scolnik et al. | |
| 2002/0010708 A1 | 1/2002 | McIntosh | |
| 2002/0022982 A1 | 2/2002 | Cooperstone et al. | |
| 2002/0035480 A1 | 3/2002 | Gordon et al. | |
| 2002/0083090 A1 | 6/2002 | Jeffrey et al. | |
| 2002/0091553 A1 | 7/2002 | Callen et al. | |
| 2002/0091836 A1 | 7/2002 | Moetteli | |
| 2002/0095416 A1 | 7/2002 | Schwols | |
| 2002/0103680 A1 | 8/2002 | Newman | |
| 2002/0108104 A1 | 8/2002 | Song et al. | |
| 2002/0119433 A1 | 8/2002 | Callender | |
| 2002/0120859 A1 | 8/2002 | Lipkin et al. | |
| 2002/0123902 A1 | 9/2002 | Lenore et al. | |
| 2002/0143595 A1 | 10/2002 | Frank et al. | |
| 2002/0143735 A1 | 10/2002 | Ayi et al. | |
| 2002/0147801 A1 | 10/2002 | Gullotta et al. | |
| 2002/0162053 A1 | 10/2002 | Os | |
| 2002/0178138 A1 | 11/2002 | Ender et al. | |
| 2002/0184068 A1 | 12/2002 | Krishnan et al. | |
| 2002/0184148 A1 | 12/2002 | Kahn et al. | |
| 2003/0004985 A1 | 1/2003 | Kagimasa et al. | |
| 2003/0014386 A1 | 1/2003 | Jurado | |
| 2003/0018663 A1 | 1/2003 | Cornette et al. | |
| 2003/0018693 A1 | 1/2003 | Rosenfeld et al. | |
| 2003/0031991 A1 | 2/2003 | Genevie | |
| 2003/0033295 A1 | 2/2003 | Adler et al. | |
| 2003/0036994 A1 | 2/2003 | Witzig et al. | |
| 2003/0046287 A1 | 3/2003 | Joe | |
| 2003/0051144 A1 | 3/2003 | Williams | |
| 2003/0069839 A1 | 4/2003 | Whittington et al. | |
| 2003/0074354 A1 | 4/2003 | Lee et al. | |
| 2003/0097342 A1 | 5/2003 | Whittingtom | |
| 2003/0110228 A1 | 6/2003 | Xu et al. | |
| 2003/0139827 A1 | 7/2003 | Phelps | |
| 2003/0208689 A1 | 11/2003 | Garza | |
| 2003/0229522 A1 | 12/2003 | Thompson et al. | |
| 2004/0002044 A1 | 1/2004 | Genevie | |
| 2004/0003351 A1 | 1/2004 | Sommerer et al. | |
| 2004/0019496 A1 | 1/2004 | Angle et al. | |
| 2004/0034659 A1 | 2/2004 | Steger | |
| 2004/0039933 A1 | 2/2004 | Martin et al. | |
| 2004/0060063 A1 | 3/2004 | Russ et al. | |
| 2004/0068432 A1 | 4/2004 | Meyerkopf et al. | |
| 2004/0078368 A1 | 4/2004 | Excoffier et al. | |
| 2004/0088283 A1 | 5/2004 | Lissar et al. | |
| 2004/0088332 A1 | 5/2004 | Lee et al. | |
| 2004/0088729 A1 | 5/2004 | Petrovic et al. | |
| 2004/0103284 A1 | 5/2004 | Barker | |
| 2004/0133573 A1 | 7/2004 | Miloushev et al. | |
| 2004/0138903 A1 | 7/2004 | Zuniga | |
| 2004/0143444 A1* | 7/2004 | Opsitnick et al. | 705/1 |
| 2004/0187164 A1 | 9/2004 | Kandasamy et al. | |
| 2004/0193703 A1 | 9/2004 | Loewy et al. | |
| 2004/0204947 A1 | 10/2004 | Li et al. | |
| 2004/0215619 A1 | 10/2004 | Rabold | |
| 2004/0216039 A1 | 10/2004 | Lane et al. | |
| 2004/0260569 A1 | 12/2004 | Bell et al. | |
| 2005/0060175 A1 | 3/2005 | Farber et al. | |
| 2005/0071251 A1 | 3/2005 | Linden et al. | |
| 2005/0071284 A1* | 3/2005 | Courson et al. | 705/80 |
| 2005/0074734 A1 | 4/2005 | Randhawa | |
| 2005/0114241 A1 | 5/2005 | Hirsch et al. | |
| 2005/0144114 A1 | 6/2005 | Ruggieri et al. | |
| 2005/0149307 A1 | 7/2005 | Gurpinar et al. | |
| 2005/0160361 A1 | 7/2005 | Young | |
| 2005/0165734 A1 | 7/2005 | Vicars et al. | |
| 2005/0187813 A1 | 8/2005 | Genevie | |
| 2005/0203821 A1 | 9/2005 | Petersen et al. | |
| 2005/0203931 A1* | 9/2005 | Pingree et al. | 707/100 |
| 2005/0240578 A1 | 10/2005 | Biederman, Sr. et al. | |
| 2005/0246451 A1 | 11/2005 | Silverman et al. | |
| 2005/0283346 A1 | 12/2005 | Elkins, II et al. | |
| 2006/0036464 A1 | 2/2006 | Cahoy et al. | |
| 2006/0036649 A1 | 2/2006 | Simske et al. | |
| 2006/0074793 A1 | 4/2006 | Hibbert et al. | |
| 2006/0095421 A1 | 5/2006 | Nagai et al. | |
| 2006/0126657 A1 | 6/2006 | Beisiegel et al. | |
| 2006/0136435 A1 | 6/2006 | Nguyen et al. | |
| 2006/0143248 A1 | 6/2006 | Nakano et al. | |
| 2006/0143464 A1 | 6/2006 | Ananthanarayanan et al. | |
| 2006/0149407 A1 | 7/2006 | Markham et al. | |

(56) References Cited

U.S. PATENT DOCUMENTS

| | | |
|---|---|---|
| 2006/0149735 A1 | 7/2006 | DeBie et al. |
| 2006/0156381 A1 | 7/2006 | Motoyama |
| 2006/0156382 A1 | 7/2006 | Motoyama |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0195430 A1* | 8/2006 | Arumainayagam et al. ...... 707/3 |
| 2006/0229999 A1 | 10/2006 | Dodell et al. |
| 2006/0230044 A1 | 10/2006 | Utiger |
| 2006/0235899 A1 | 10/2006 | Tucker |
| 2006/0242001 A1 | 10/2006 | Heathfield |
| 2007/0016546 A1 | 1/2007 | De Vorchik et al. |
| 2007/0048720 A1 | 3/2007 | Billauer |
| 2007/0061156 A1 | 3/2007 | Fry et al. |
| 2007/0061157 A1 | 3/2007 | Fry et al. |
| 2007/0078900 A1 | 4/2007 | Donahue |
| 2007/0099162 A1 | 5/2007 | Sekhar |
| 2007/0100857 A1 | 5/2007 | DeGrande et al. |
| 2007/0112783 A1* | 5/2007 | McCreight et al. ............ 707/10 |
| 2007/0118556 A1 | 5/2007 | Arnold et al. |
| 2007/0156418 A1 | 7/2007 | Richter et al. |
| 2007/0162417 A1 | 7/2007 | Cozianu et al. |
| 2007/0179829 A1 | 8/2007 | Laperi et al. |
| 2007/0179939 A1 | 8/2007 | O'Neil et al. |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0245013 A1 | 10/2007 | Saraswathy et al. |
| 2007/0271230 A1 | 11/2007 | Hart et al. |
| 2007/0271308 A1 | 11/2007 | Bentley et al. |
| 2007/0271517 A1* | 11/2007 | Finkelman et al. ........... 715/742 |
| 2007/0282652 A1 | 12/2007 | Childress et al. |
| 2007/0288659 A1 | 12/2007 | Zakarian et al. |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0071561 A1 | 3/2008 | Holcombe |
| 2008/0086506 A1 | 4/2008 | DeBie et al. |
| 2008/0091283 A1 | 4/2008 | Balci et al. |
| 2008/0126156 A1 | 5/2008 | Jain et al. |
| 2008/0147642 A1* | 6/2008 | Leffingwell et al. .............. 707/5 |
| 2008/0148193 A1 | 6/2008 | Moetteli |
| 2008/0148346 A1 | 6/2008 | Gill et al. |
| 2008/0154969 A1 | 6/2008 | DeBie |
| 2008/0154970 A1 | 6/2008 | DeBie |
| 2008/0177790 A1 | 7/2008 | Honwad |
| 2008/0195597 A1 | 8/2008 | Rosenfeld et al. |
| 2008/0209338 A1 | 8/2008 | Li |
| 2008/0229037 A1 | 9/2008 | Bunte et al. |
| 2008/0262898 A1 | 10/2008 | Tonchev et al. |
| 2008/0294674 A1 | 11/2008 | Reztlaff et al. |
| 2008/0301207 A1 | 12/2008 | Demarest et al. |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1* | 2/2009 | Yao .................................. 705/7 |
| 2009/0064184 A1 | 3/2009 | Chacko et al. |
| 2009/0094228 A1 | 4/2009 | Bondurant et al. |
| 2009/0100021 A1 | 4/2009 | Morris et al. |
| 2009/0106815 A1 | 4/2009 | Brodie et al. |
| 2009/0119677 A1 | 5/2009 | Stefansson et al. |
| 2009/0150168 A1 | 6/2009 | Schmidt |
| 2009/0150866 A1 | 6/2009 | Schmidt |
| 2009/0150906 A1 | 6/2009 | Schmidt et al. |
| 2009/0157465 A1 | 6/2009 | Heathfield |
| 2009/0193210 A1 | 7/2009 | Hewett et al. |
| 2009/0241054 A1 | 9/2009 | Hendricks |
| 2009/0249179 A1 | 10/2009 | Shieh et al. |
| 2009/0249446 A1 | 10/2009 | Jenkins et al. |
| 2009/0254572 A1* | 10/2009 | Redlich et al. .................. 707/10 |
| 2009/0287658 A1 | 11/2009 | Bennett |
| 2010/0017756 A1 | 1/2010 | Wassom, Jr. et al. |
| 2010/0050064 A1 | 2/2010 | Liu et al. |
| 2010/0057418 A1 | 3/2010 | Li et al. |
| 2010/0070315 A1 | 3/2010 | Lu et al. |
| 2010/0088583 A1 | 4/2010 | Schachter |
| 2010/0250625 A1 | 9/2010 | Olenick et al. |
| 2010/0251109 A1 | 9/2010 | Jin et al. |
| 2011/0106773 A1* | 5/2011 | Smith et al. .................... 707/694 |
| 2011/0191344 A1 | 8/2011 | Jin et al. |

FOREIGN PATENT DOCUMENTS

| | | |
|---|---|---|
| JP | 8-97832 | 4/1996 |
| JP | 9-62601 | 3/1997 |
| JP | 2997607 | 10/1999 |
| JP | 2001-251302 | 9/2001 |
| JP | 3443531 | 6/2003 |
| JP | 2003-324479 | 11/2003 |
| JP | 2006-13969 | 1/2006 |
| WO | 2006/070471 A1 | 7/2006 |

OTHER PUBLICATIONS

International Serarch Report for PCT/JP2005/000411 mailed Apr. 26, 2005.

Lewis "Digital Mountin—Where Data Resides—Data Discovery from the Inside Out", available at http://digitalmountain.com/fullaccess/Article3.pdf accessed Mar. 13, 2012, Digital Mountain, Inc., 2004, 5 pgs.

Sears "E-Discovery: A Tech Tsunami Rolls in", available at http://www.krollontrack.com/publications/ediscoverybackgroundpaper. pdf, accessed Mar. 13, 2012, National Court Reporters Association, Apr. 2006, 7 pgs.

www.pss-systems.com; retrieved from www. Archive.org any linkage dated Dec. 8, 2005, 130 pages.

PSS Systems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

PSS Systems, Inc., Preservation Benchmarks for 2007 and Beyond, www.pss-systems.com, pp. 1-3 (2007).

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Litigation Communications and Collections, www.pss-systems.com (2006), retrieved online on Dec. 8, 2010 from archive.org, 1 page.

Zhu, et al.; "Query Expansion Using Web Access Log Files"; Lecture Notes in Computer Science, 2005, vol. 3588/2005, pp. 686-695, Springer-Verlag, Berlin, Hedelberg.

Human Capital Mangement; "mySAP ERP Human Capital Management: Maximizing Workforce Potential"; retrieved from archive.org Aug. 18, 2009 www.sap.com, 1 page.

"Microsoft Computer Dictionary", Microsoft Press, Fifth Edition, 2002, p. 499.

Cohasset Associates, "White Paper: Compliance Requirements Assessment, IBM DB2 Records Manager and Record-Enabled Solutions", Oct. 2004, 54 pgs.

"HEI Records Management: Guidance on Developing a File Plan", JISC infoNet, Jan. 2007, 7 pgs.

\* cited by examiner

| | | | | | | | | Administrator, System | Help | Log out |

ATLAS  Quick Navigation ▽
My Atlas | Law Library | 📖🔒 Schedules | Projects | Matters | Reports | Cost | Communications | 🗄 🔒 🖧 Map | My Tasks | My Holds | Admin My Tasks

| Name | | Data Source | All | ▽ | Custodian | All | ✗ | | Search |
| | | | | | | | | | Clear |

— ▶ Advanced Search

| Name | Data Source | Custodians | Status | Assigned To | Type | Author | Last Updated | Due date |
|---|---|---|---|---|---|---|---|---|
| Collection Plan | APPROVER01 - Minor Edit | 6 | Execute | Administrator, System | Collection | Administrator, System | Jun 2, 2010 | △ |
| Bulk Collection Plan | APPROVER01 - Minor Edit | 1 | Execute | Administrator, System | Collection | Administrator, System | Jun 2, 2010 | |

*FIG. 11*

Initial collection from keyplayers

My Tasks

| Plan Details | Custodians | Ownership | Notes | History |

| | |
|---|---|
| Name | Initial collection from keyplayers |
| On-going | |
| Author | Administrator, System |
| Status | Execute |
| Template | date and keywords |
| File System and Path Metadata | |

Parameters

| | |
|---|---|
| from date | May 3, 2010 |
| to date | Jun 17, 2010 |
| keywords | IDG contract attorney |

| | |
|---|---|
| Request | Bond Request 01 |
| Due Date | |
| Index By Custodian | ✓ |
| Requires Approval | |
| Data Source | No data source |
| Instructions | collection into the US-west evidence repository |

Administrator, System | Help | Log out

My Atlas | Law Library | Schedules | Projects | Matters | Reports | Cost | Communications | Map | My Tasks | My Holds | Admin Save | Request Completion | Request Suspend

*FIG. 12*

ATLAS

Quick Navigation ▼    Administrator, System | Help | Log out

My Atlas | Law Library | 📖 🏠 Schedules | 📄 🏠 Map | My Tasks | My Holds | Admin

My Atlas | Law Library | Schedules | Projects | Matters | Reports | Cost | Communications My Tasks
Initial collection from keyplayers

| Plan Details | Custodians | Ownership | Notes | History |

A'alberg, Alan                                                    📋 List View    ⇦ Prev  ⇧ Next

| Status | Not Executed ▼ |
|---|---|
| Name | A'alberg, Alan |
| Phone | PA Field 1 |
| Email | bijualan@sseal.secretseal.com |
| Mailstop | PA Field 2 |

Parameters

| from date | May 3, 2010 |
|---|---|
| to date | Jun 17, 2010 |
| keywords | IDG contract attorney |
| Instructions | collection into the US-west evidence repository |

Collection Logs                                     📄 New    📄 New External

| Resource Typ | Log Entry | Stored In | Date | Conducted By |
|---|---|---|---|---|

Showing 0 of 0                                                          Page: 1

*FIG. 13*

ATLAS Quick Navigation ▼ | Administrator, System | Help | Log out
My Atlas | Law Library | 📖 🏠 🏫 Schedules | Projects | Matters | Reports | Cost | Communications | 📇 🏠 🏢 Map | My Tasks | My Holds | Admin My Tasks
Initial collection from keyplayers

| Plan Details | Custodians | Ownership | Notes | History |

A'alberg, Alan

| | |
|---|---|
| Status | Completed ▼ |
| Name | A'alberg, Alan |
| Phone | PA Field 1 |
| Email | bijualan@sseal.secretseal.com |
| Mailstop | PA Field 2 |

Parameters

| | |
|---|---|
| from date | May 3, 2010 |
| to date | Jun 17, 2010 |
| keywords | IDG contract attorney |
| Instructions | collection into the US-west evidence repository |

Collection Logs

📋 List View    ⇐ Prev   ⇒ Next

📄 New    📄 New External

| Resource Typ | Log Entry | Stored In | Date | Conducted By |
|---|---|---|---|---|
| Electronic Files | emails from InfoSphere | | Jun 3, 2010 | Administrator, System |

Showing 1 of 1      Page: 1

*FIG. 14*

ENTERPRISE EVIDENCE REPOSITORY PROVIDING ACCESS CONTROL TO COLLECTED ARTIFACTS

BACKGROUND OF THE INVENTION

1. Technical Field

The invention relates to electronic discovery (eDiscovery). More particularly, the invention relates to an enterprise evidence repository.

2. Description of the Prior Art

Electronic discovery, also referred to as e-discovery or eDiscovery, concerns discovery in civil litigation, as well as tax, government investigation, and criminal proceedings, which deals with information in electronic form. In this context, the electronic form is the representation of information as binary numbers. Electronic information is different from paper information because of its intangible form, volume, transience, and persistence. Also, electronic information is usually accompanied by metadata, which is rarely present in paper information. Electronic discovery poses new challenges and opportunities for attorneys, their clients, technical advisors, and the courts, as electronic information is collected, reviewed, and produced. Electronic discovery is the subject of amendments to the Federal Rules of Civil Procedure which are effective Dec. 1, 2006. In particular, for example, but not by way of limitation, Rules 16 and 26 are of interest to electronic discovery.

Examples of the types of data included in e-discovery include e-mail, instant messaging chats, Microsoft Office files, accounting databases, CAD/CAM files, Web sites, and any other electronically-stored information which could be relevant evidence in a law suit. Also included in e-discovery is raw data which forensic investigators can review for hidden evidence. The original file format is known as the native format. Litigators may review material from e-discovery in any one or more of several formats, for example, printed paper, native file, or as TIFF images.

The revisions to the Federal Rules formally address e-discovery and in the process, have made it a nearly certain element of litigation. For corporations, the rules place a very early focus on existing retention practices and the preservation and discovery of information.

In response to the climate change in the e-discovery arena, corporations are:

1) enhancing their processes for issuing legal holds and tracking collections;

2) looking for ways to reduce the costs of collecting, processing and reviewing electronic data; and 3) looking upstream to reduce the volume of unneeded data through better retention policies that are routinely enforced.

The new field of e-discovery management has emerged to assist companies that are overwhelmed by the requirements imposed by the new rules and the spate of legal and regulatory activity regarding e-discovery.

Currently, e-discovery management applications (EMA) rely on a variety of approaches to store electronic data for e-discovery. For example:

EMAs store content as binary objects in a database. Transaction information as well as file collections are typically stored in the same relational database located on a database server;

EMAs also store content as content objects in a content management system. EMAs can use a content management system, such as EMC DOCUMENTUM, EMC CORPORATION, Hopkinton, Mass., to store unstructured content; and EMAs can use a local or networked file system to store content as files in a file system and a database to store file metadata.

Such conventional methods provide convenience and functionality, such as allowing the data to be updated, allowing it to be checked in and checked out, and so on. However, data stored for the purpose of e-discovery typically has the character of being immutable and unstructured, i.e. the data is to be permanently stored, or at least stored for a very long time; the data is not to be changed or updated or checked-in or -out very often; and it is typically unnecessary to organize or structure the data in a database or content base. In view of the immutable, unstructured nature of e-discovery data, such conventional storage approaches, in spite of their convenience and functionality, involve a number of disadvantages:

High hardware cost: Databases, content management systems, and local file systems are usually stored in arrays of hard disks. The high hardware expense may be justified for transactional data, but it is exorbitant in the case of the immutable, unstructured content typically used in e-discovery;

High maintenance cost: In all of the above scenarios, maintenance requires a skilled administrator. In the case of a database, the administrator must be trained in database technology; in case of a content management system (which usually resides on top of a database), the administrator must also be skilled in content management systems. These maintenance costs may amount to hundreds of thousands of dollars in salary and thousands in training costs. As above, such expense may be justified for transactional data but is needless in the case immutable unstructured content;

Extra information technology (IT) planning and coordination: Necessary disk space must be projected and purchased upfront, requiring close involvement of IT personnel, e.g. coordination between parties such as the Chief Legal Officer and the Chief Information Officer;

High capital investment: To ensure available disk space, the company has to buy more disk space than it needs at any particular time; and Inefficiencies in cost accounting: It would be beneficial to treat storage as a cost related to a particular litigation matter as opposed to a capital expense.

Thus, there exists a need to provide a way of storing collected content in e-discovery applications that eliminates unnecessary expense and managerial and administrative overhead, thus achieving cost savings and simplifying operations.

SUMMARY OF THE INVENTION

An embodiment of the invention comprises a system that includes a controller that is configured to generate and propagate instructions to an execution agent. The execution agent is configured to collect and deposit collected artifacts into a repository. The controller coordinates allocation of the storage in the repository. The controller propagates the collection instructions to the execution agent: the instructions contain a location for depositing collected artifacts. Write access must be granted to the execution agent. Such access is provided to a location in the repository for collected artifacts that are to be deposited into a specified location. Once the execution agent deposits the collected artifacts in the specified location in the repository, a summary of collected artifacts is propagated to the controller, thus providing transparency into the overall collection process.

Collected artifacts can be made available to a processing agent that is configured to perform various processing functions on them. The controller manages appropriate levels of access to the collected artifacts, while the repository enforces the level of access. The controller can grant read only access to the collected artifacts or it can allow for controlled changes to be made to the metadata associated with the collected artifact. An agent can process the data and generate additional metadata that can be associated with the collected artifacts and then saved in the repository.

Collected artifacts, along with the contextual data and additional metadata, reside in the repository. The controller can grant read only access to an agent that is capable of extracting all of the data from the repository and exporting it out.

A system can have more than one repository to store collected artifacts and metadata. In such a configuration, the controller allocates storage in an appropriate repository. The controller issues instructions to the execution agent with the location in an appropriate repository. The summary of the actual collections is then propagated to the controller from the repositories.

BRIEF DESCRIPTION OF THE DRAWINGS

FIG. 11 is a screen shot showing a 'My Tasks' tab according to the invention;

FIG. 12 is a first screen shot showing an initial collection from key players according to the invention;

FIG. 13 is a second screen shot showing an initial collection from key players according to the invention;

FIG. 14 is a third screen shot showing an initial collection from key players according to the invention.

DETAILED DESCRIPTION OF THE INVENTION

Related Documents

The following documents are cited herein to provide background information in connection with various embodiments of the herein disclosed invention. These documents are incorporated herein in their entirety based upon this reference thereto:

Discovery Cost Forecasting Patent Applications:
Forecasting Discovery Costs Using Historic Data; Ser. No. 12/165,018; filed 30 Jun. 2008;
Forecasting Discovery Costs Based On Interpolation Of Historic Event Patterns; Ser. No. 12/242,478; filed 30 Sep. 2008;
Forecasting Discovery Costs Based on Complex and Incomplete Facts; Ser. No. 12/553,055; filed 2 Sep. 2009; and
Forecasting Discovery Costs Based On Complex And Incomplete Facts; Ser. No. 12/553,068; filed 2 Sep. 2009;
Automation Patent Application:
Method And Apparatus For Electronic Data Discovery; Ser. No. 11/963,383; filed 21 Dec. 2007; and
Collection Transparency Patent Application:
Providing Collection Transparency Information To An End User To Achieve A Guaranteed Quality Document Search And Production In Electronic Data Discovery; Ser. No. 12/017,236; 21 Jan. 2008.

Terminology

The following terms have the meaning associated with them below for purposes of the discussion herein:

Enterprise Discovery Management System (EDMS): technology to manage eDiscovery workflow in an enterprise such as the Atlas Enterprise Discovery Management system offered by PSS Systems of Mountain View, Calif.;

Enterprise Content Management (ECM) tools: a set of technologies to capture, manage, retain, search, and produce enterprise content, such as IBM's FileNet;

Early Case Assessment (ECA) tools: technology to evaluate risks associated with eDiscovery by identifying and analyzing relevant evidence;

Discovery Cost Forecasting (DCF): technology to model, forecast costs associated with eDiscovery, such as the Atlas DCF;

Evidence Repository (EvR): a system and processes for securely collecting, preserving, and providing access to documents and related metadata collected as part of eDiscovery;

Collection Manifest: a file describing various attributes of the contents of a collection including, but not limited to, the following type of metadata: chain of custody, file types, sizes, MAC dates, original locations, etc; and Self-collections: a process of collection in which a legal function sends collection instructions directly to custodians and the custodians perform collection from local PCs, email, PDAs, file share, etc.

Abstract System

Figure 1:
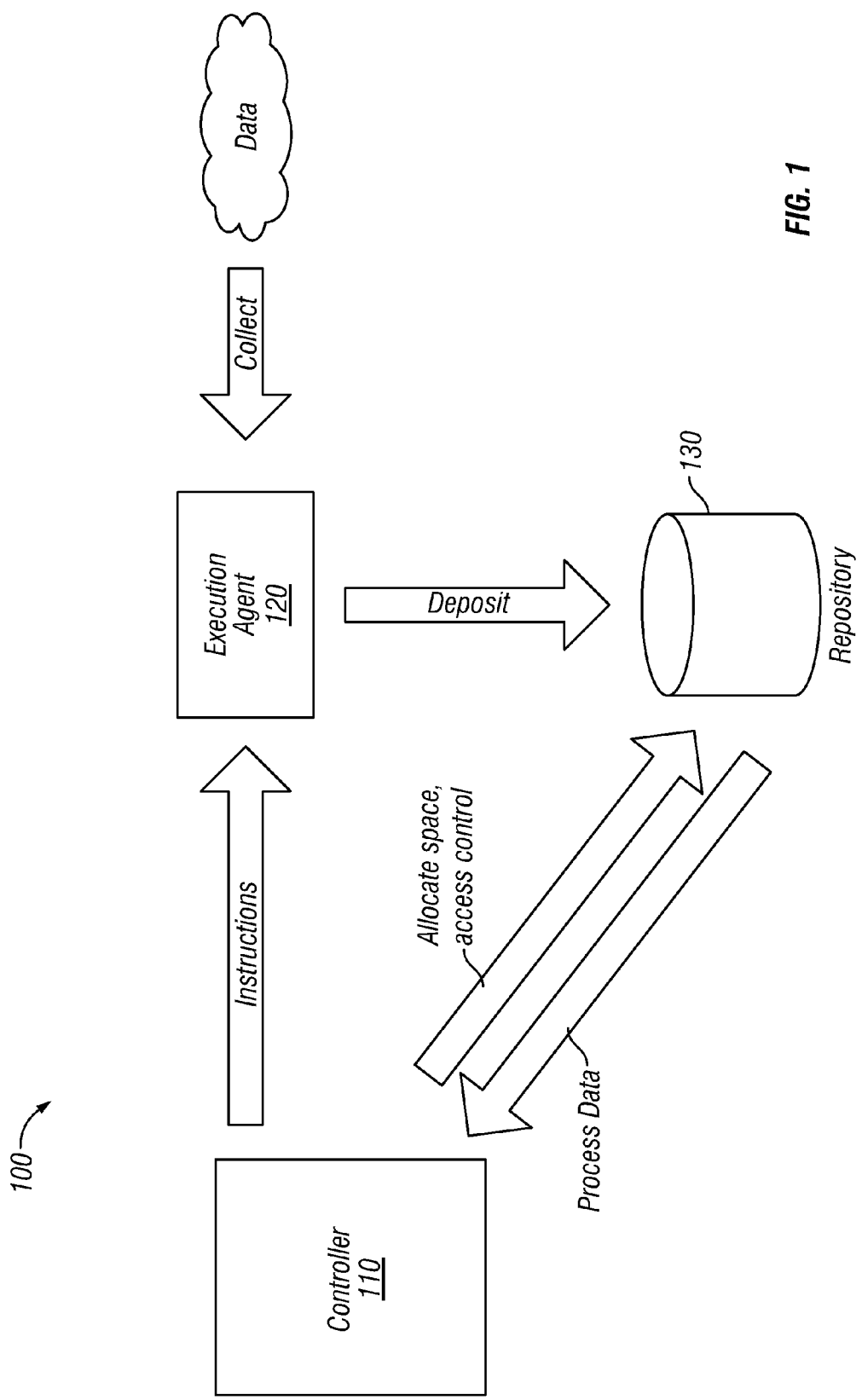
FIG. 1 is a block diagram that illustrates a system of a controller, an execution agent, and a repository for storing collected artifacts according to the invention.

FIG. 1 is a block diagram that illustrates a system 100 comprising a controller 110 that is configured to generate and propagate instructions to an execution agent 120. Instructions can be structured as well defined parameters, including date range and other filtering criteria applicable to a particular data source; or unstructured, including text instructions including data location, filtering criteria, and where to deposit collected artifacts. The execution agent is configured to collect and deposit collected artifacts into a repository 130. The controller coordinates allocation of the storage in the repository. The controller propagates the collection instructions to the execution agent: the instructions contain a location for depositing collected artifacts. The location can be a physical location of the repository, network file path, etc. Write access must be granted to the execution agent. Such access is provided to a location in the repository for collected artifacts that are to be deposited into a specified location. Once the execution agent deposits the collected artifacts in the specified location in the repository, a summary of collected artifacts is propagated to the controller, thus providing transparency into the overall collection process. The summary can be an unstructured description of the data collected or a structured collection manifest with additional metadata.

Collected artifacts can be made available to a processing agent (see 510 on FIG. 5) that is configured to perform various processing functions on them, such as review, culling, tagging, etc. The controller manages appropriate levels of access to the collected artifacts, while the repository enforces the level of access. The controller can grant read only access to the collected artifacts or it can allow for controlled changes to be made to the metadata associated with the collected artifact. An agent can process the data and generate additional metadata, such as tags and notes, that can be associated with the collected artifacts and then saved in the repository.

Collected artifacts, along with the contextual data and additional metadata, reside in the repository. The controller can grant read only access to an agent that is capable of extracting all of the data from the repository and exporting it out. A system can have more than one repository to store collected artifacts and metadata (see FIG. 10). In such a configuration, the controller allocates storage in an appropriate repository. The controller issues instructions to the execution agent with the location in an appropriate repository. The summary of the actual collections is then propagated to the controller from the repositories.

eDiscovery System

Figure 2:
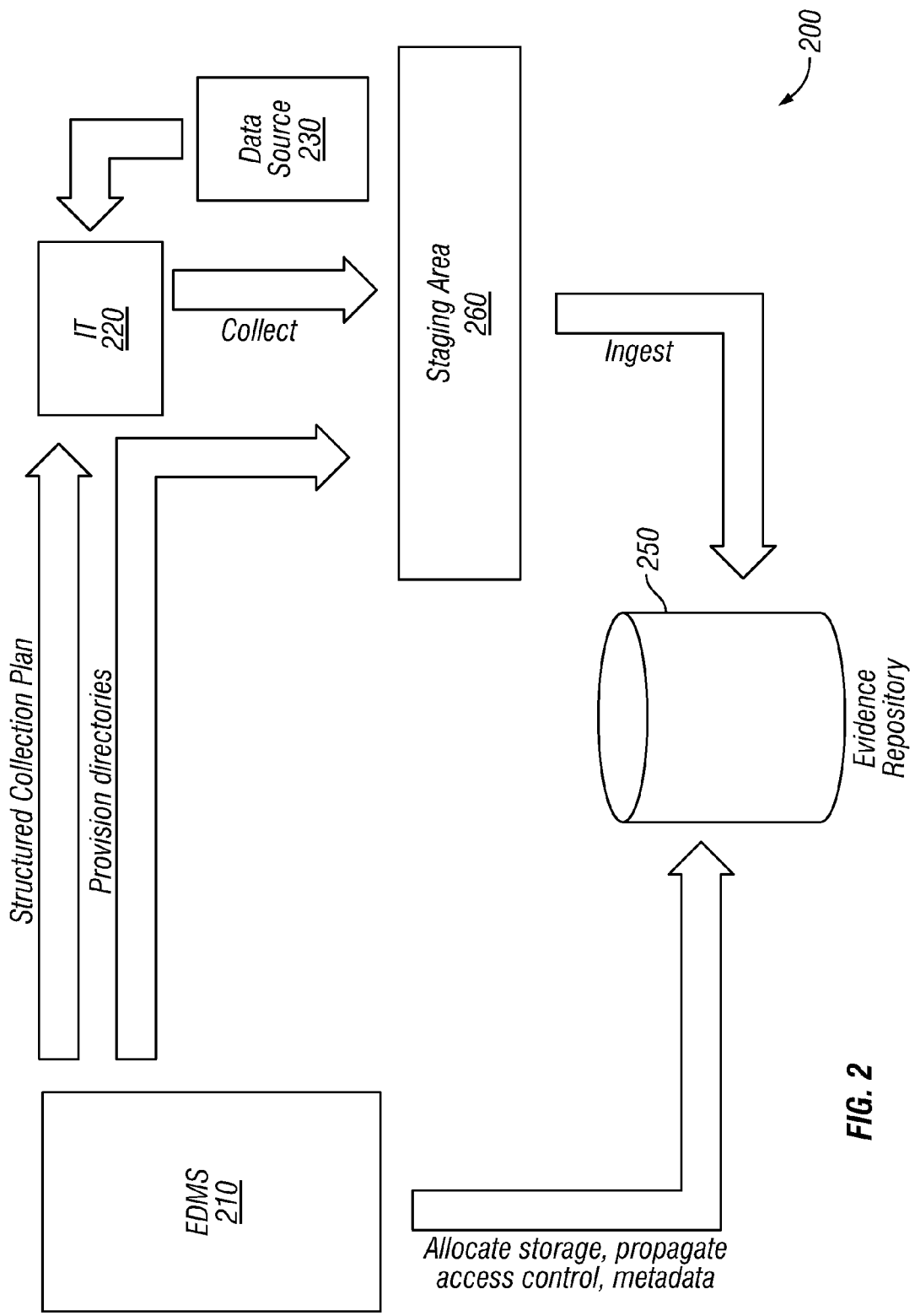
FIG. 2 is a block diagram that illustrates an eDiscovery management system (EDMS) according to the invention.

FIG. 2 is a diagram that illustrates an integrated electronic discovery (eDiscovery) system 200 in which individual systems and methods for collecting and managing evidence are employed according to one embodiment of the invention. In FIG. 2, an eDiscovery management system (EDMS) 210 is configured to propagate instructions to an IT person 220 and to allocate space in an evidence repository 250. The IT collects data from a data source 230. Data is deposited to the evidence repository. Monitoring data is propagated from the evidence repository to the EDMS. The system manages the overall eDiscovery workflow and provides visibility into the overall process by monitoring how many documents are deposited, ingested, indexed, etc. To do this, a number of files and their states are monitored at each stage of the process and that information is propagated to EDMS. It is not necessary to propagate collected data back to the EDMS. In one embodiment, the EDMS 210 allocates storage and provisions directories in the transient storage, also referred to herein as the staging area 260.

The EDMS propagates the legal case and other process data and metadata to the evidence repository, including (see FIG. 3) legal matter 331, collection plan 340, and collection logs 350, 351, based on data source or custodian, etc.

The EDMS 210 also generates a structured collection plan with detailed collection instructions. The IT 220 receives the instructions and performs collections from the data source 230, depositing the collected documents to the location of the directory in the staging area specified in the collection instructions received from EDMS.

Content source metadata is propagated along with the content of the collected documents. This type of metadata is derived from the content of collected file, for example size in bytes, page count, checksum, or hash code, calculated based on the content of a file, MIME type, etc.

Location metadata is propagated along with the contents of collected files. This type of metadata represents the location from where the files were originally collected. Examples of the metadata include: name or address of a PC, server, file path, file name, and modified, accessed, and created date of the file.

Collected documents and the metadata are ingested from the staging area to the evidence repository. Collected documents are grouped and linked to appropriate metadata that has been previously propagated to the evidence repository.

Collection Staging Area

Figure 3:
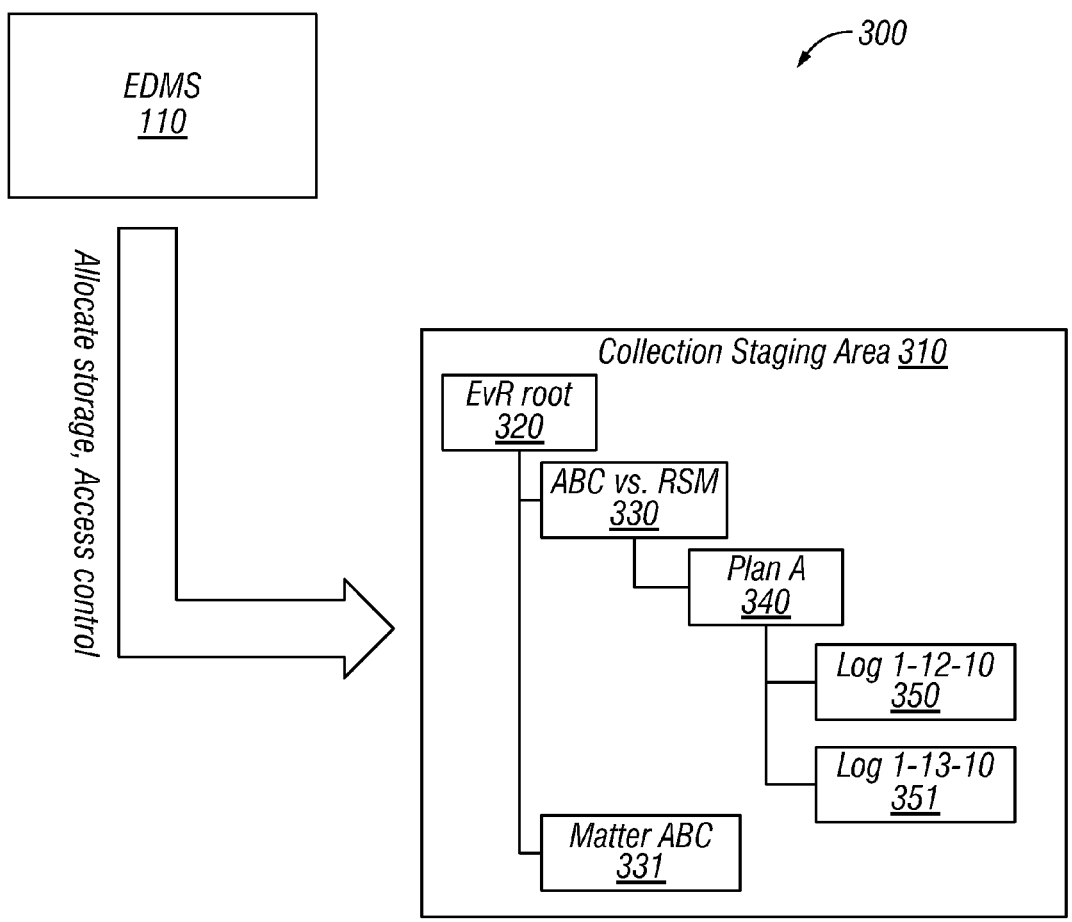
FIG. 3 is a block diagram that illustrates automatic provisioning of a collection staging area controlled by an EDMS according to the invention.

FIG. 3 is a diagram that illustrates how a collection staging area 300 is provisioned and managed. A collection plan is typically used by the legal department to manage the process of collecting potential evidence. For example, the legal department can initiate a new collection plan for collecting evidence from key players identified in a case. Additionally, the collection plan also specifies additional collection instructions as parameters for collections, e.g. list of keywords, effective date range, etc.

When a new collection plan is created and published, the EDMS automatically propagates the collection plan, custodians, and data source information, and creates a directory structure in the collection staging area, which in FIG. 3, for example, includes a root 320, matter 330, 331, plan 340, and logs 350, 351. The structure of the directories is optimized to simplify manual processing, with the directories named in a human-readable way that refers to legal matters, collection plans, data sources, collection logs, and custodians. The structure shown in FIG. 3 is provided for purposes of example only; those skilled in the art will appreciate that other structures may be used in connection with the invention herein disclosed.

The EDMS also propagates the access control rules to the staging area by granting an appropriate level of access on a target collection deposit directory to an appropriate user or a group of users, based on the work assignment as defined in the EDMS.

Having an automatically managed staging area for collections enables simple and reliable collection process. The EDMS contains all of the data necessary to execute a collection based on the collection parameters specified by the legal department as part of the collection plan. Folders in the staging area are automatically provisioned for collections, data sources, and custodians. IT does not need to create folders manually. Collection instructions are automatically issued by the EDMS when the collection plan is published. The drop-off location parameters are automatically generated based on the network file share location path of an auto-provisioned directory in the collection staging area.

Evidence Repository

The evidence repository manages large volumes of collected documents and metadata and can be built on top of an existing content management system, such as an ECM.

Figure 4:
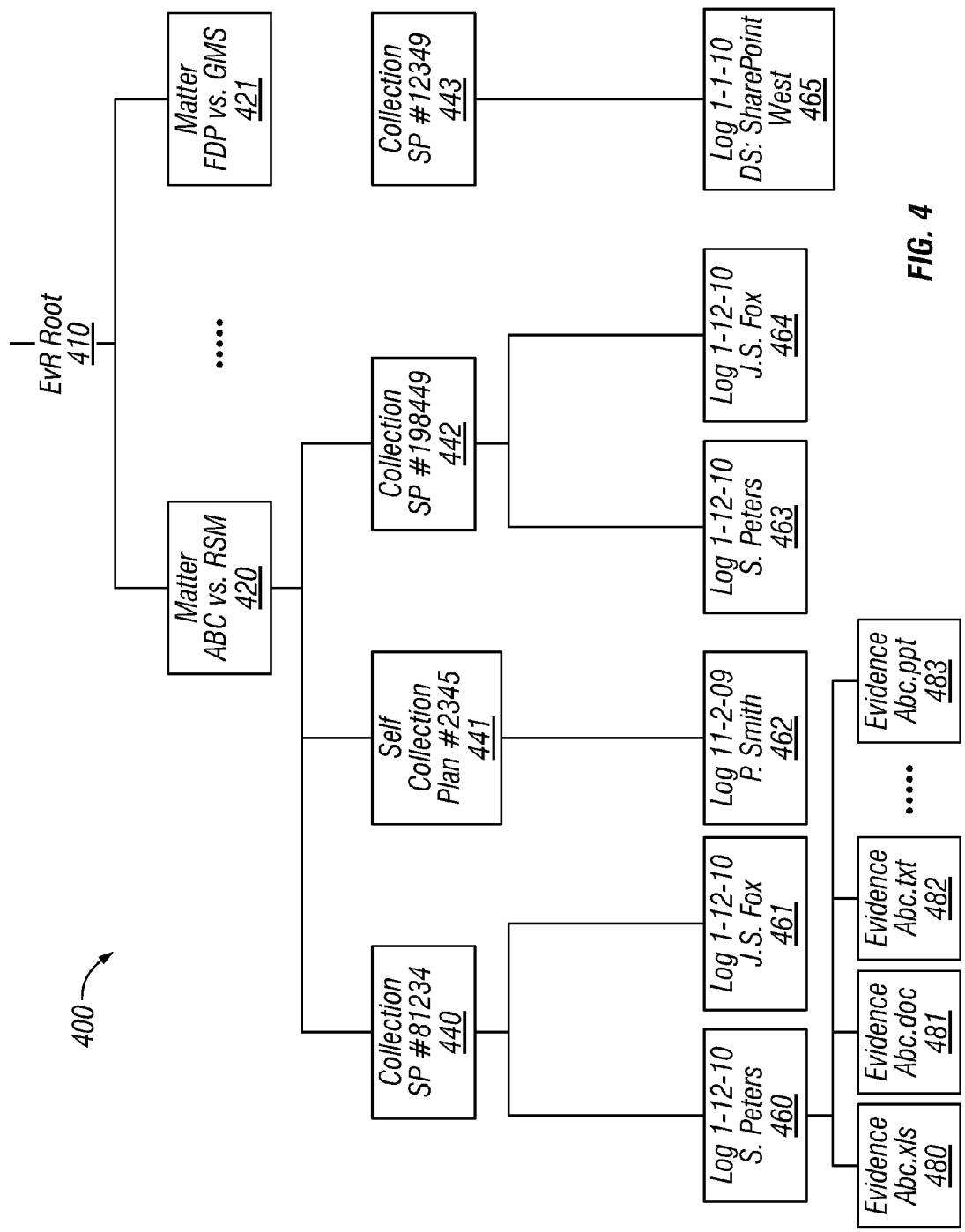
FIG. 4 is a diagram that illustrates an example of an EER data model in an ECM system according to the invention.

FIG. 4 is a diagram that illustrates an example of the evidence repository data model 400 for an ECM system. The evidence repository root 410 is a top-level container for all the legal cases and related data. Entities representing matters 420 and 421 contain the process metadata propagated from EDMS, including, for example, any of the following: legal case name, legal case unique identifier, description, matter security group, matter type, attorney, legal assistant, outside counsel, effective date, status, etc.

The legal case entity is a container for the collection or interview plans 440, 441, 442, 443 which can be further categorized into structured collection plans, such as 440, 442, 443, and self collection plans 441. Collection plans have process metadata propagated from the EDMS that includes, for example, the following properties: name, status, date, collection parameters, etc.

Collection plans contain collection logs 460, 461, 462, 463, 464, 465. Collection logs have process metadata that includes, for example custodian, data source, log entry, conducted by, date conducted, status, etc. The collection logs contain evidence items that include the content and metadata of the collected documents. The metadata for the collection log is comprised of the process, source, and location metadata, as defined above.

Self-Collections

Advanced EDMS systems, such as the Atlas LCC, allow for custodian self-collections. This is a type of collection process when individual custodians receive collection instructions from the legal department and collect evidence, such as emails, documents, and other data, with easy to use tools provided to individual custodians. When using that mechanism the content and metadata may be collected to a dedicated EDMS storage.

The EDMS is responsible for propagating the data collected as part of a self-collection to the evidence repository.

Existing collections stored in EDMS are automatically migrated by moving the content and related case metadata to the evidence repository. This allows for centralized evidence management regardless of the type of a collection and its origins.

Data Processing

Data processing is an important part of the overall eDiscovery process. The EDMS can grant an appropriate level of access to users authorized to use a processing tools against the collected data stored in the evidence repository to enable the data processing. Examples of such access include read-only access to the case data and metadata or a subset of this data, and write access to a subset of metadata. Some data processing tools, such as Early Case Assessment (ECA) tools, can generate additional metadata, such as tags, notes, etc. The metadata generated by such a tool can be stored in the evidence repository if the EDMS grants write access on the subset of metadata associated with documents in the context of a specified legal case, plan, etc.

Data Export

Export tools 520 (see FIG. 5), such as export module of the Atlas EDM suite, are used to extract the content and metadata of documents collected in the evidence repository and to package and ship the data for an outside review or other use.

Export metadata is a metadata associated with an event of exporting set of documents for an outside review. The metadata contains, for example, the date of export, volume of export in bytes, estimated number of pages exported, number of documents exported, etc.

DCF Metadata

The evidence repository is expected to track the overwhelming majority of the collected data. Facts created as a result of the collection, processing, and exporting of the collected data are automatically propagated from the evidence repository to a DCF system. Having the most accurate and up-to date facts is critical for reliable and precise eDiscovery cost modeling and forecasting.

Figure 5:
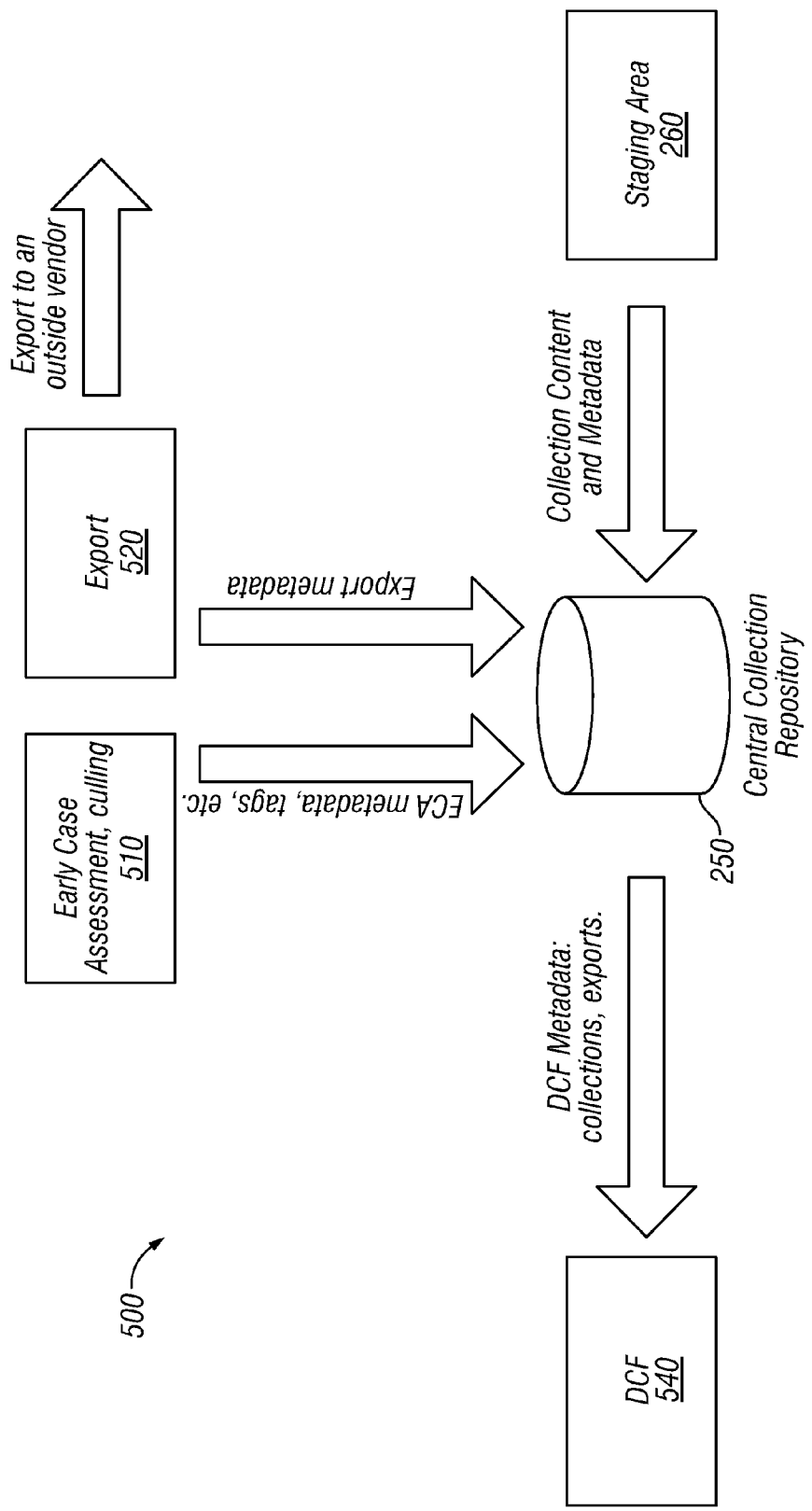
FIG. 5 is a block diagram that illustrates a flow of DCF metadata according to the invention.
Figure 6:
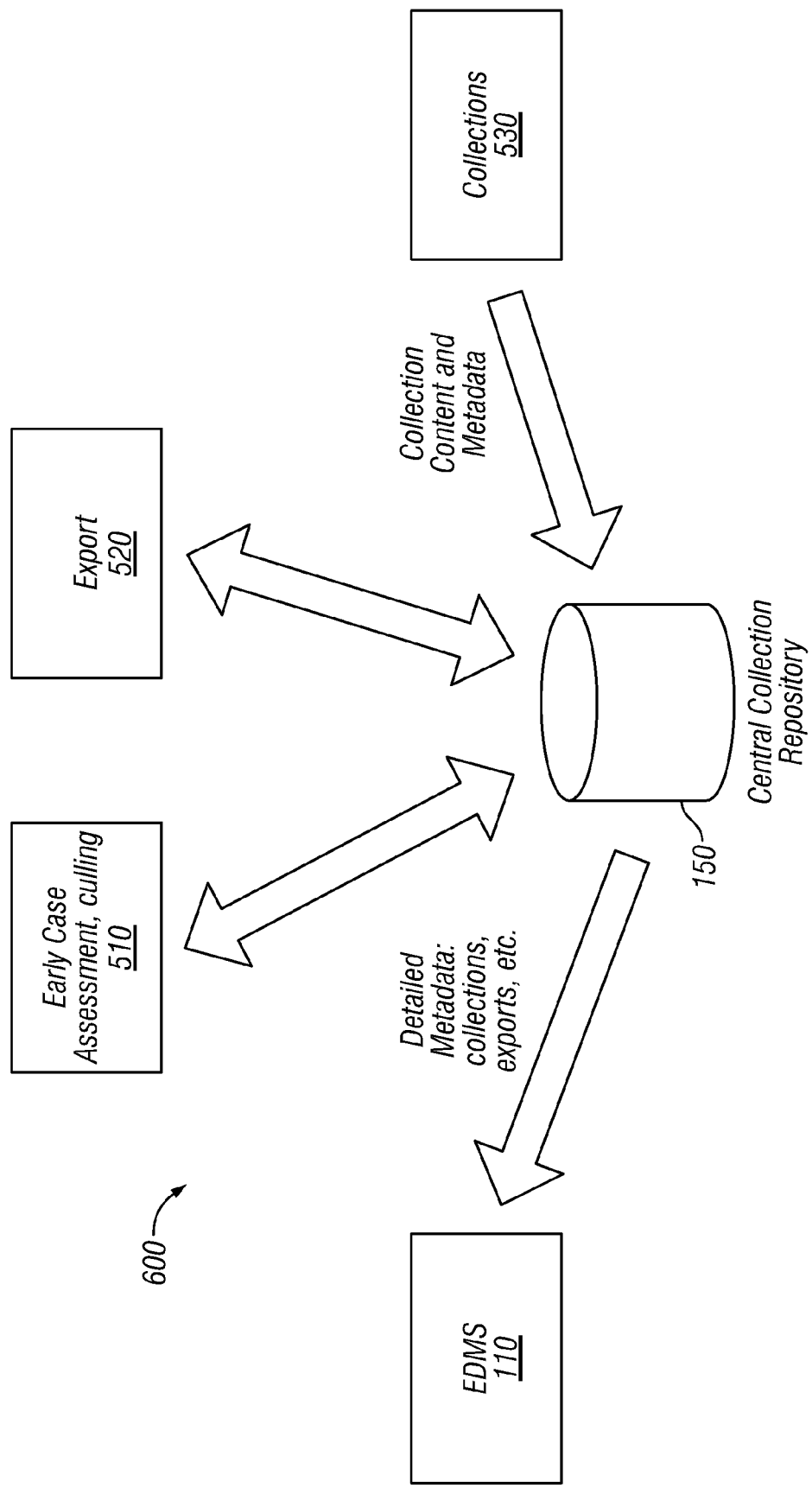
FIG. 6 is a block diagram that illustrates a flow of metadata from an evidence repository to an EDMS according to the invention.

FIG. 5 is a diagram that illustrates a flow 500 of the DCF metadata; and FIG. 6 is a block diagram that illustrates a flow of metadata from an evidence repository to an EDMS. As the collection content and metadata are being ingested into the evidence repository, the summary data on the volume of collections in MB, estimated page count, time, etc. is being continuously aggregated on a per-matter basis and propagated from the evidence repository to the DCF 540.

The collected content is processed and analyzed by using an ECA 510 or similar set of tools. The collected content is tagged with additional ECA metadata and the metadata is propagated to the evidence repository. The metadata can be further aggregated and propagated to the DCF system and used to improve the accuracy of the discovery cost modeling and forecasting further.

Export tools 520 are used to extract the content and metadata of documents collected in the evidence repository and package and ship the data for an outside review or other use. The volume and timing metrics, such as volume collected in pages and GB, timing of collections, and number of custodians collected from or associated with an export event, are critical for an accurate discovery cost modeling and forecasting. The evidence repository enables highly reliable and repeatable automated process of propagating the export metadata to DCF when it becomes available.

The export data propagated to the DCF includes, for example, volume of export in bytes, estimated page count, date of export, number of documents, etc.

Ingestion Process

The ingestion process is responsible for ingesting the documents and metadata deposited into the collection drop-off locations within the staging area to the evidence repository.

The ingestion process relies on relationships between a folder in the staging area and collection log entity in the ECM that were previously established by the EDMS. Based on the location of documents in the staging area, the ingestion process finds previously created corresponding collection log entities in the evidence repository and links documents ingested from a collection log folder to the collection log entity in the evidence repository.

Figure 7:
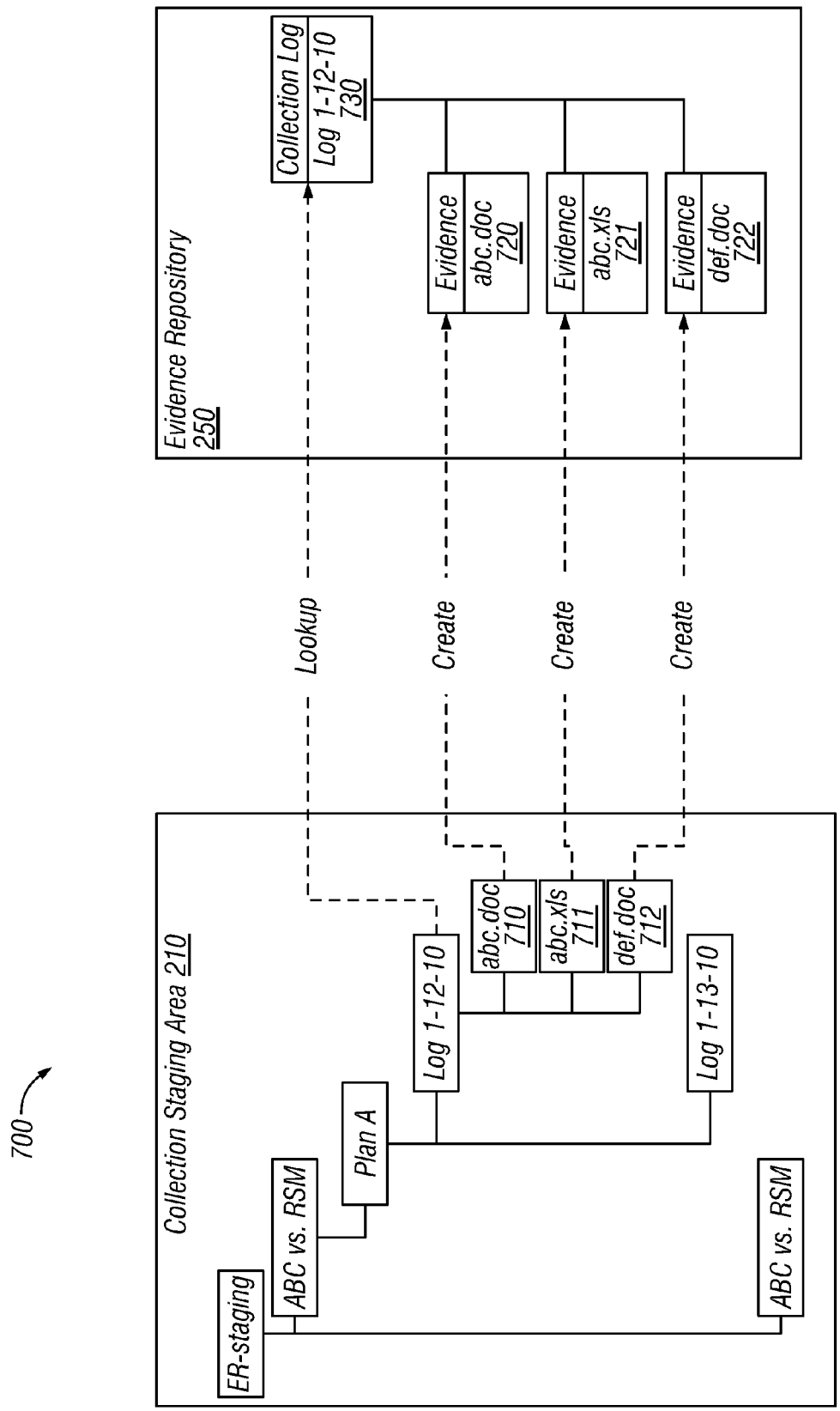
FIG. 7 is a block diagram that illustrates how content and metadata from a staging area is ingested into an evidence repository according to the invention.

FIG. 7 is a diagram that illustrates an example 700 of how documents and folders in the staging area can be ingested and mapped to the entities in the evidence repository. The ingestion process detects a new document in the staging area 210. New documents 710, 711, 712 were deposited as a response to the collection request for a given collection log from 1-12-10 which is associated with a collection target, collection plan, legal request, and legal matter. The process metadata was automatically propagated to the EER earlier. The ingestion process looks up the collection log entity 730 in the repository 250 that corresponds to the location of the parent folder in the staging area Collection Log 1-12-10, and it then creates evidence entities 720, 721, 722. Documents in the staging area can now be removed or archived. Documents in the evidence repository are now associated with all the process metadata propagated from the EDMS.

In some cases collections might also include additional metadata in a form of a collection manifest which can be in proprietary formats or in an XML based formats, such as EDRM XML. Collection manifest metadata is ingested along with collected contents. A collection manifest contains additional metadata including, for example, chain of custody, original location, etc. That metadata gets associated with document evidence entity as part of the ingestion process.

Improve Reliability

The reliability and accuracy of the collection process can be further improved by adding a secure token to the collection instructions for the IT. The secure token is a file containing information that uniquely identifies the identity of an individual collection target in a context of a collection plan.

The IT is instructed to deposit the token along with the collected files into the drop-off location specified in the instructions. As part of the ingestion process the system automatically validates the integrity of the collection including chain of custody and detects inconsistencies by comparing the information in the secure token against the expected collection target, collection plan, and other attributes based on the location from the where collected data is being ingested Depending on the ingestion policies such as a collection can be rejected. Exceptions are escalated to an appropriate authority for handling. If, upon the ingestion validation, the system detects that IT has mistakenly deposited data collected for a target into incorrect location along with a secure token for a given target, the system rejects the collection and alerts appropriate IT users and, optionally the legal department, with all of the details necessary to correct the situation by placing collected data in an appropriate location. This affects the overall status of the collection process propagated to EDMS, making it transparent to all of the parties involved until the issue is resolved.

Collection and Metadata Re-Use

Figure 8:
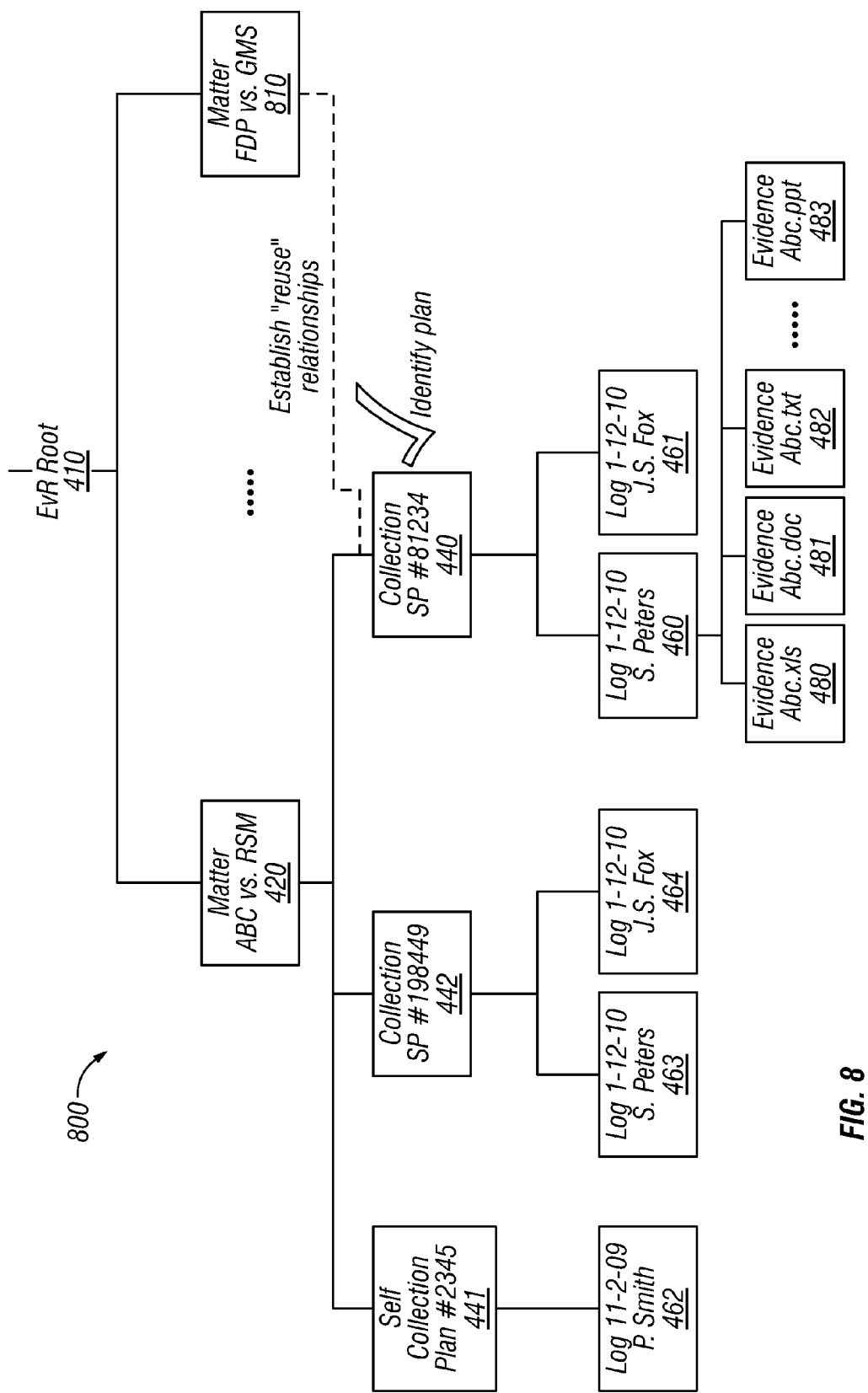
FIG. 8 is a diagram that illustrates collection content and metadata re-use according to the invention.

The evidence repository holds large volumes of collected data including, for example, content, source, location, process, export, DCF metadata and the metadata generated by ECA and other data processing tools. Collection with subsequent analysis and culling can be very costly, especially if done repeatedly. Redundant collection can be reduced or eliminated through the collection re-use. FIG. 8 is a diagram that illustrates an example 800 of a collection reuse. Based on the similar legal case from the past, a member of legal staff identifies a collection plan 440 and, optionally, collection targets within the plan to be reused. The EDMS instructs the evidence repository to establish reuse relationships in the collection repository in such a way that new matter 810 contains a reused collection plan from an existing matter 420. The relationships can be established by copying the evidence entities or by referencing existing collection plan container.

An entire set the evidence metadata or a subset can also be reused taking a full advantage of the analysis, culling, and export that occurred in the legal case and collection plan being reused.

Monitoring

Figure 9:
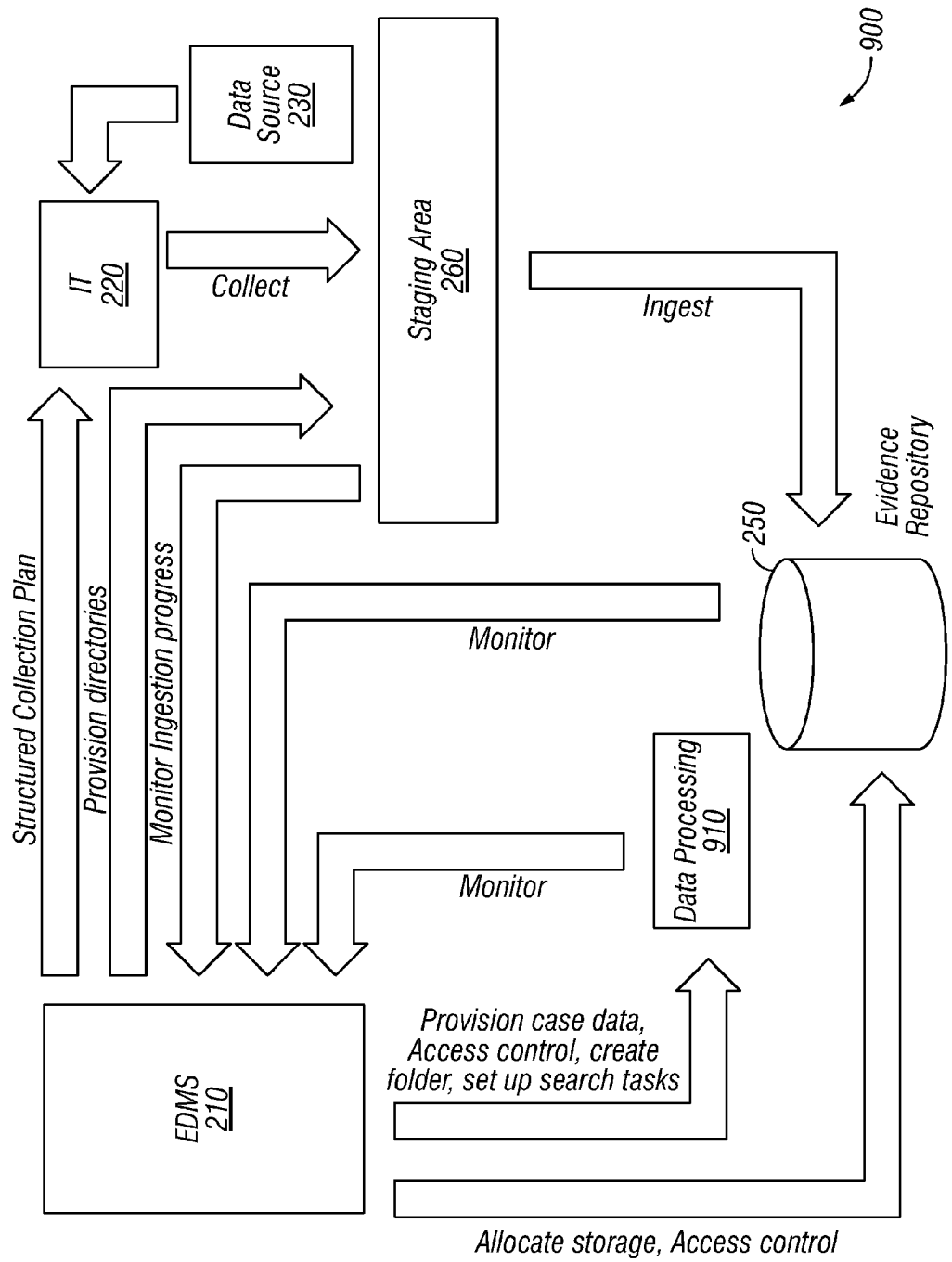
FIG. 9 is a block diagram that illustrates different components of the overall collection process monitoring system according to the invention.

FIG. 9 is a diagram that illustrates overall the different components for collection process monitoring 900.

The EDMS 210 is responsible for the overall collection process. All the stages of the overall process report exceptions, a summary, and important statistics back to the EDMS. The EDMS aggregates the monitoring data from all the stages of the collection process, thus providing additional analytics. The EDMS thus enables visibility into the overall collection process.

The staging area 260 is monitored by analyzing the contents of the drop-off collection locations. The following exceptions and statistics, for example, are reported back to the EDMS: number of files deposited, pending ingestion, failed to delete, failed to ingest within the time limit, etc. These statistics are grouped by collection log, collection plan, legal case, and repository.

The evidence repository is monitored using platform specific mechanisms to detect new documents matching appropriate criterions. The following exceptions and statistics, for example, are reposted back to the EDMS: number of files ingested, failed to link to an appropriate collection log, various timeouts, etc. These statistics are grouped by collection log, collection plan, legal case, and repository and are propagated to the EDMS.

The data processing tools 910 may require an additional content indexing or linking steps for the collected data to become available for processing. For example, many ECA tools employ more sophisticated content and metadata indexing mechanism that evidence repository may provide. This requires additional processing as part of making the collected data available for the analysis. The following exceptions and statistics, for example, are reposted back to the EDMS from the data processing step: number of files available for analysis, number of files pending, number of files failed, various timeouts, etc. These statistics are grouped by collection log, collection plan, legal case, and repository and are propagated to the EDMS.

Multiple Repositories

The system supports a configuration with multiple repositories. All the repositories have a dedicated staging area from where the collected data is ingested to each individual repository. The EDMS maintains a catalog of evidence repositories which contains the names, access control rules, and path to the root of the staging area for each repository.

The evidence repository can be selected for a matter type, legal case, and collection plan. When a collection plan is published, the EDMS allocates storage and provision directories in the staging area of a selected evidence repository. The EDMS propagates the legal case and other process data and metadata to the appropriate evidence repository.

The EDMS generates and propagates collection instructions to an IT or an automated collection tools such as Atlas ACA containing the location of the staging area for a selected repository.

Many countries have data protection laws designed to protect information considered to be personally identifiable. For example, EU directives establish a level of protection that effectively makes data transfer from an EU member to the US illegal.

A multiple local evidence repositories can be set up to eliminate the need to transfer the data across jurisdictions. The instructions are generated such that collected content and metadata are deposited in a location within the jurisdiction specific staging area. Collection is ingested into a local ECM within the local evidence repository.

Figure 10:
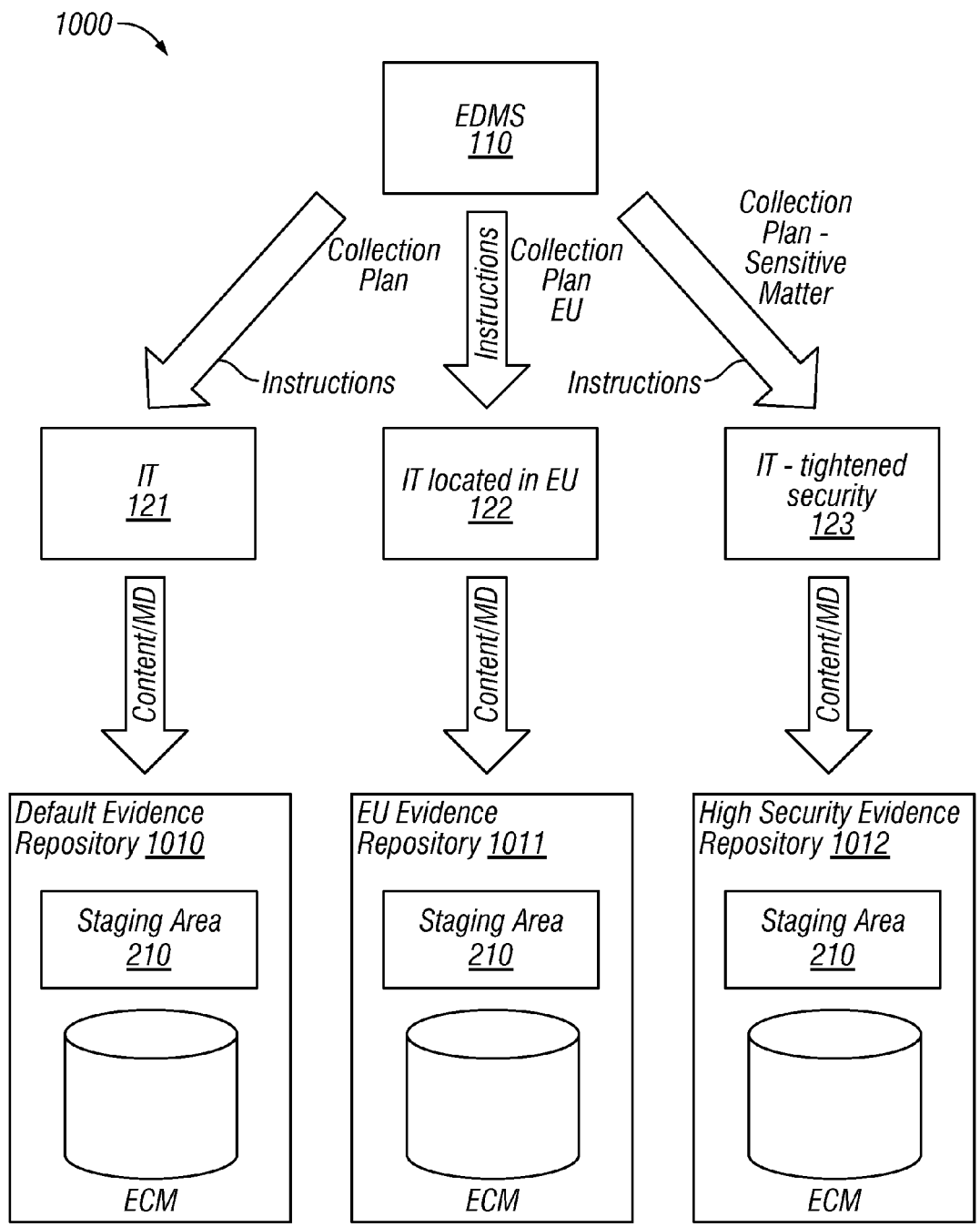
FIG. 10 is a block diagram that illustrates support for multiple repositories according to the invention.

FIG. 10 is a diagram that illustrates an example of a system 1000 with multiple evidence repositories located in the US and in EU. A collection plan involving custodians and data sources located in the EU 122 is propagated to an EU repository 1011.

Multiple repositories with various levels of security can be used depending on a legal case security group, individual legal case, and collection plan. Thus, a collection plan involving custodians and data sources located in an IT department 121 is propagated to a default repository 1010. For a case with increased level of security the collection instructions are generated in a way that collected content and metadata are deposited and managed by a secure repository. FIG. 10 also illustrates an example of the integrated system with multiple evidence repositories including High Security Evidence Repository 123. For a legal case with an elevated level of security classification the collection instructions for an IT with higher security clearance and directed towards a secure repository 1012. As a result collected documents end up in a secure repository that maintains appropriate level of security throughout the life cycle of a case.

Figure 15:
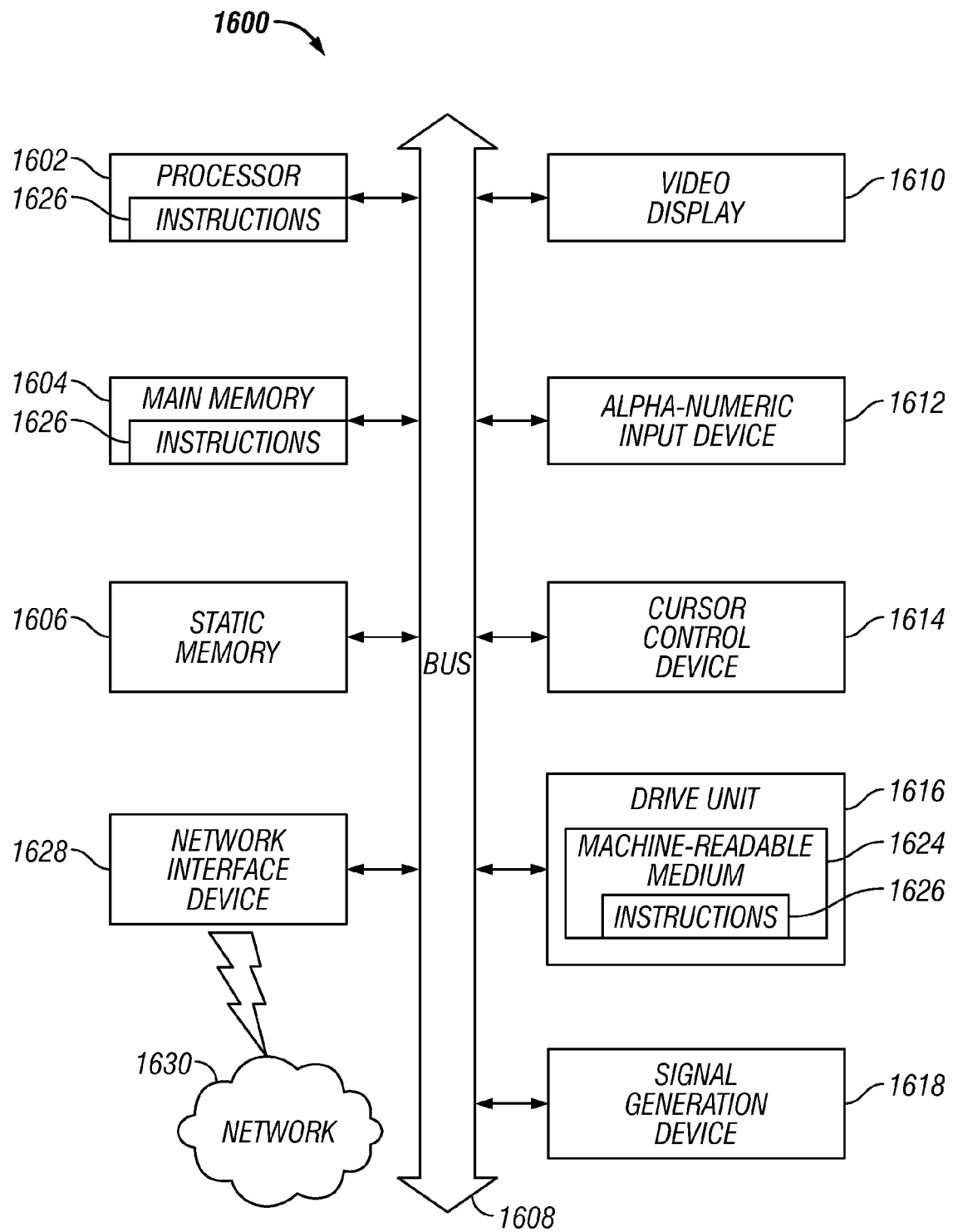
FIG. 15 is a block schematic diagram of a machine in the exemplary form of a computer system within which a set of instructions may be executed to cause the machine to perform any of the herein disclosed methodologies.

Structured Collection Indexed by Custodian
    Paralegal Creates Manual Structured Collection Plan:
    Select DS and associated collection template
    Identify custodians
    Provide collection parameters
    Click on the 'ownership' tab and assign the owners—IT personnel
    Publish collection plan, e.g. initial email collection from key players for a specified date range with specified list of keyword Staging Area Sync
Provision directories
Provision access control, e.g. grant write-only or read-write access to the provisioned directories for appropriate IT users
Evidence Repository Sync
Collection metadata is automatically propagated to an EvR
Access Control data is propagated to the repository
Data Processing/ECA Sync
Create a case container
Propagate collection metadata from repository to the data processing tool
Propagate access control data from EDMS to the data processing tool
Set up search and indexing tasks
IT Person Gets Collection Instructions
IT person or a group identified as owner of the collection plan on the IT side finds a new collection request/plan in 'My Tasks' tab (see FIG. 11
Instructions contain a list of parameters and list of custodians
Collection instructions might define a number of custodians, e.g. John S, Amy B. etc, and list of parameters of various types, e.g. date range, list of keywords, etc. (see FIG. 12)e
IT person clicks on the a specific custodian, this opens up custodian view (see FIG. 13)
New auto-calculated parameter 'Evidence Repository Collection Location' shows location where collected files should be deposited
Instructions clearly state that all collected documents are to be placed in the specified directory., e.g. \\server_name\path_element1\path_element2\deposit_directory
Clicking on the new parameter opens Windows Explorer, pointing to an automatically provisioned location to allow IT personnel to deposit collected files at that location for a given custodian, collection plan, etc
Secure token is optionally provided as part of the collection instructions
IT Personnel Perform Collections
Use existing collection process and tools
Optional secure token is deposited into the specified location
Collection for a given custodian deposited in the specified location
Upon finishing collection IT personnel set status for a custodian as completed (see FIG. 14)
Collection Ingestion
Files are processed as soon as deposited into the designated directory
Additional validation performed to ensure that the files were deposited into correct directory using secure token validation
All the documents collected for a given matter are automatically propagated to a data processing tool via automated search and import functionality of the processing tools or external timer task.
Data on the collection summary is propagated to the DCF
EDM
Legal user selects a legal case
Select an evidence repository within the case
User is taken to a data processing or ECA tool, such as the IBM eDiscovery analyzer
Data Processing Tools/ECA
Access control is propagated from EDMS so only authorized users get access to the case data
Custom search template exposes EDMS specific metadata, such as matterId, requested, collection log, etc.
User or a group of users performs analysis, culling etc. using eDA
Data on the data analysis summary is propagated to the DCF
Data Export
Authorized legal user creates a set of data to be exported for outside review
Data on the export summary is propagated to the DCF
Collection Process Monitoring
Collection deposit process: How many files deposited, processed
Collection ingestion process: How many files ingested, pre-processed (archives expanded, prepared for indexing), metadata associated, errors, etc
Analysis preparation: How many files were prepared for analysis, indexed, added to a case, errors
Computer Implementation FIG. 15 is a block schematic diagram of a machine in the exemplary form of a computer system 1600 within which a set of instructions may be executed to cause the machine to perform any one of the herein disclosed methodologies. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for storing and accessing collected artifacts in an electronic discovery system, comprising:
   providing a repository for storing collected artifacts;
   providing an execution agent configured to collect artifacts to be stored in the repository; and
   providing a controller configured to generate and propagate instructions to the execution agent;
   wherein the instructions specify a location in a directory of a staging area for the repository;
   wherein the controller is configured to provision the directory of the staging area;
   wherein the controller is configured to coordinate allocation and delivery of the collected artifacts to the location in the directory of the staging area;
   wherein the controller is configured to manage access control to the collected artifacts in the repository; and
   wherein the controller is configured to generate and propagate factual data with regard to delivery of the collected artifacts into the repository.

2. The method of claim 1, further comprising:
   providing a processing agent configured to perform data processing on the collected artifacts.

3. The method of claim 2, wherein the processing agent is configured to provide and control read access to the collected artifacts.

4. The method of claim 3, wherein the processing agent is configured to provide and control metadata write access to the collected artifacts.

5. The method of claim 4, wherein the processing agent is configured to update metadata associated with the collected artifacts.

6. The method of claim 1, wherein the controller is configured to export the collected artifacts, along with contextual data, from the repository.

7. The method of claim 1, further comprising providing a plurality of repositories.

8. An electronic discovery apparatus, comprising:
   a repository, wherein collected artifacts, along with the contextual data and additional metadata, reside in the repository;
   a staging area for the repository;
   an execution agent is configured to collect artifacts and to deposit collected artifacts into a location in a directory of the staging area for the repository and to the repository;
   a controller configured to generate and propagate collection instructions to the execution agent, wherein the collection instructions indicate a location for depositing collected artifacts in the directory of the staging area, wherein the controller provisions the directory in the staging area, and wherein the controller coordinates allocation of storage in the repository.

9. The apparatus of claim 8, wherein the controller grants write access to the execution agent, and wherein the write access is provided to a location in the repository for collected artifacts that are to be deposited into a specified location.

10. The apparatus of claim 8, wherein a summary of collected artifacts is propagated to the controller once the execution agent deposits collected artifacts in a specified location in the repository.

11. The apparatus of claim 8, wherein the controller is configured to
    manage appropriate levels of access to collected artifacts, wherein the repository enforce a level of access.

12. The apparatus of claim 11, wherein the controller is configured to perform any of granting read only access to collected artifacts and allowing for controlled changes to be made to metadata associated the said collected artifacts.

13. The apparatus of claim 8, further comprising:
    an agent configured to process data and generate additional metadata that is associated with collected artifacts and then saved in the repository.

14. The apparatus of claim 13, wherein the controller is configured to grant read only access to an agent that is capable of extracting all data from the repository and exporting the data from the repository.

15. The apparatus of claim 8, further comprising:
    a plurality of repositories that are configured to store collected artifacts and metadata,
    wherein the controller is configured to allocate storage in an appropriate repository by issuing instructions to the execution agent with a location in an appropriate repository.

16. The apparatus of claim 15, wherein a summary of actual collections is propagated to the controller from the repositories.

17. A non-transitory computer readable medium for storing program instructions that, when executed by a processor, cause the processer to perform operations for storing and accessing collected artifacts in an electronic discovery system, comprising:
    providing a repository for storing collected artifacts;
    providing an execution agent configured to collect artifacts to be stored in the repository; and
    providing a controller configured to generate and propagate instructions to the execution agent;
    wherein the instructions specify a location in a directory of a staging area for the repository;
    wherein the controller is configured to provision the directory of the staging area;
    wherein the controller is configured to coordinate allocation and delivery of the collected artifacts to the location in the directory of the staging area;
    wherein the controller is configured to manage access control to the collected artifacts in the repository; and
    wherein the controller is configured to generate and propagate factual data with regard to delivery of the collected artifacts into the repository.

* * * * *